US012647750B2

(12) United States Patent
Selma et al.

(10) Patent No.: US 12,647,750 B2
(45) Date of Patent: Jun. 2, 2026

(54) CELLULAR BROADCAST SYSTEM TO DISPERSE CROWDS

(71) Applicant: Google LLC, Mountain View, CA (US)

(72) Inventors: Fernando Selma, Madrid (ES); Thomas Klingenbrunn, San Diego, CA (US); Aamir Akram, San Jose, CA (US); Hung Tsang, San Jose, CA (US)

(73) Assignee: Google LLC, Mountain View, CA (US)

( * ) Notice: Subject to any disclaimer, the term of this patent is extended or adjusted under 35 U.S.C. 154(b) by 354 days.

(21) Appl. No.: 18/263,473

(22) PCT Filed: Jan. 12, 2022

(86) PCT No.: PCT/US2022/012115
§ 371 (c)(1),
(2) Date: Jul. 28, 2023

(87) PCT Pub. No.: WO2022/169571
PCT Pub. Date: Aug. 11, 2022

(65) Prior Publication Data
US 2024/0314516 A1      Sep. 19, 2024

(30) Foreign Application Priority Data
Feb. 4, 2021     (EP) ..................................... 21382090

(51) Int. Cl.
*H04W 4/021*          (2018.01)
*H04W 74/0833*        (2024.01)
*H04W 76/27*          (2018.01)

(52) U.S. Cl.
CPC ....... *H04W 4/021* (2013.01); *H04W 74/0833* (2013.01); *H04W 76/27* (2018.02)

(58) Field of Classification Search
CPC . H04W 4/021; H04W 4/025; H04W 74/0833; H04W 76/27

(Continued)

(56) References Cited

U.S. PATENT DOCUMENTS 9,195,866 B1     11/2015   Mehranfar et al.
11,074,526 B1 *   7/2021   Gormley ............... H04W 4/023
(Continued)

FOREIGN PATENT DOCUMENTS

EP          3702983       9/2020
WO          2017004171    1/2017
WO          2022169571    8/2022

OTHER PUBLICATIONS

"Evolved Universal Terrestrial Radio Access", (3GPP TS 36.331 version 16.3.0 Release 16), Jan. 2021, 1089 pages.
(Continued)

*Primary Examiner* — Jean A Gelin
(74) *Attorney, Agent, or Firm* — Colby Nipper PLLC

(57) ABSTRACT

This document describes methods, devices, systems, and means for alerting a user equipment, UE, to an overcrowding situation by network entity, the network entity storing UE identifiers and region identifiers, already known to the network entity, for multiple UEs and for each region identifier, determining a number of UEs in a spatial region associated with the region identifier. The network entity compares comparing the determined number of UEs with a region identifier to a first threshold value. If the determined number of UEs in the spatial region exceeds the first threshold value, the network entity transmits a first message including a warning message indicator to UEs in the spatial region, the warning message indicator providing an indication of warning message parameters and, based on the warning message parameters, broadcasts a second message to the UEs in the spatial region.

20 Claims, 11 Drawing Sheets

(58) Field of Classification Search
USPC ....................................................... 455/456.1
See application file for complete search history.

(56) References Cited

U.S. PATENT DOCUMENTS

| 2007/0098222 | A1 * | 5/2007 | Porter .................. | G06V 40/162 |
| | | | | 382/199 |
| 2010/0197318 | A1 * | 8/2010 | Petersen ................ | G06Q 10/10 |
| | | | | 455/456.1 |
| 2010/0323719 | A1 * | 12/2010 | Jen ........................ | H04W 64/00 |
| | | | | 455/456.1 |
| 2012/0202493 | A1 | 8/2012 | Wang et al. | |
| 2013/0157684 | A1 | 6/2013 | Moser | |
| 2014/0063191 | A1 * | 3/2014 | Bataller ............... | G06V 40/172 |
| | | | | 340/541 |
| 2014/0315511 | A1 | 10/2014 | Cha et al. | |
| 2015/0245193 | A1 * | 8/2015 | Xiong ..................... | H04W 4/80 |
| | | | | 370/328 |
| 2016/0135015 | A1 | 5/2016 | Fletcher | |
| 2016/0253740 | A1 * | 9/2016 | Goulart .................. | G06Q 90/20 |
| | | | | 705/26.8 |
| 2016/0302251 | A1 * | 10/2016 | Chatterjee ............ | H04B 7/0456 |
| 2017/0013432 | A1 | 1/2017 | Guo et al. | |
| 2018/0054276 | A1 | 2/2018 | Islam et al. | |
| 2018/0115994 | A1 * | 4/2018 | Islam ................ | H04W 74/0816 |
| 2019/0128552 | A1 | 5/2019 | Zhao et al. | |
| 2019/0208432 | A1 | 7/2019 | Carney Landow | |
| 2019/0246260 | A1 | 8/2019 | Edge et al. | |
| 2022/0377691 | A1 * | 11/2022 | Fu ..................... | H04W 56/0045 |
| 2022/0408242 | A1 * | 12/2022 | Sun ......................... | H04W 8/26 |
| 2023/0232458 | A1 * | 7/2023 | Christoffersson ........................... | |
| | | | | H04W 74/0833 |
| | | | | 370/329 |
| 2024/0389152 | A1 * | 11/2024 | Höglund ............... | H04W 48/06 |

OTHER PUBLICATIONS

"International Preliminary Report on Patentability", Application No. PCT/US2022/012115, May 16, 2023, 16 pages.

"International Search Report and Written Opinion", Application No. PCT/US2022/012115, Apr. 11, 2022, 17 pages.

"New Telia Solution Helps Prevent Overcrowding on the Beach", Retrieved at: https://www.teliacompany.com/en/news/news-articles/2020/new-telia-solution-helps-prevent-overcrowding-on-the-beach/#:~: text=To%20avoid%20overcrowding%2C%20Swedish%20seaside,packed%20beaches%20before%20heading%20there., Jul. 2, 2020, 3 pages.

"Support of ETWS/CMAS by non-BL UE operating in CE mode", 3GPP TSG RAN WG2 #105bis—Tdoc R2-1903454, Apr. 2019, 5 pages.

"Written Opinion", Application No. PCT/US2022/012115, Dec. 14, 2022, 6 pages.

Nguyen, et al., "Enabling and Emerging Technologies for Social Distancing: A Comprehensive Survey and Open Problems", IEEE DOI: 10.1109/ACCESS.2020.3018140, May 1, 2020, 43 pages.

Song, et al., "Using Mobile Sensing Technology for Capturing People Mobility Information", Nov. 2019, 8 pages.

* cited by examiner

Figure 1:
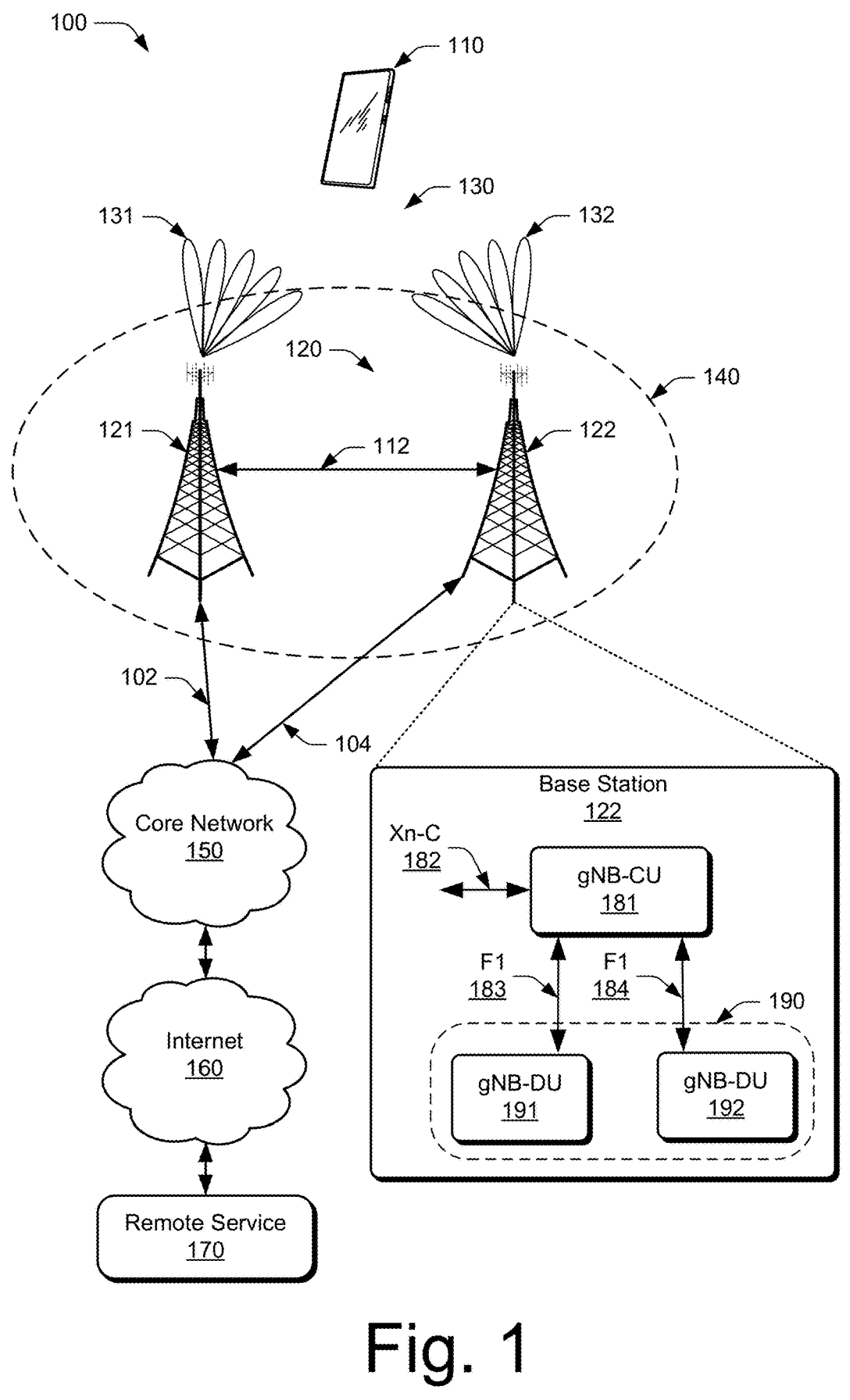

100

110

130

131

132

120

140

121

112

122

102

104

Core Network
150

Internet
160

Remote Service
170

Base Station
122

Xn-C
182 gNB-CU
181

F1
183

F1
184

190 gNB-DU
191 gNB-DU
192

Figure 2:
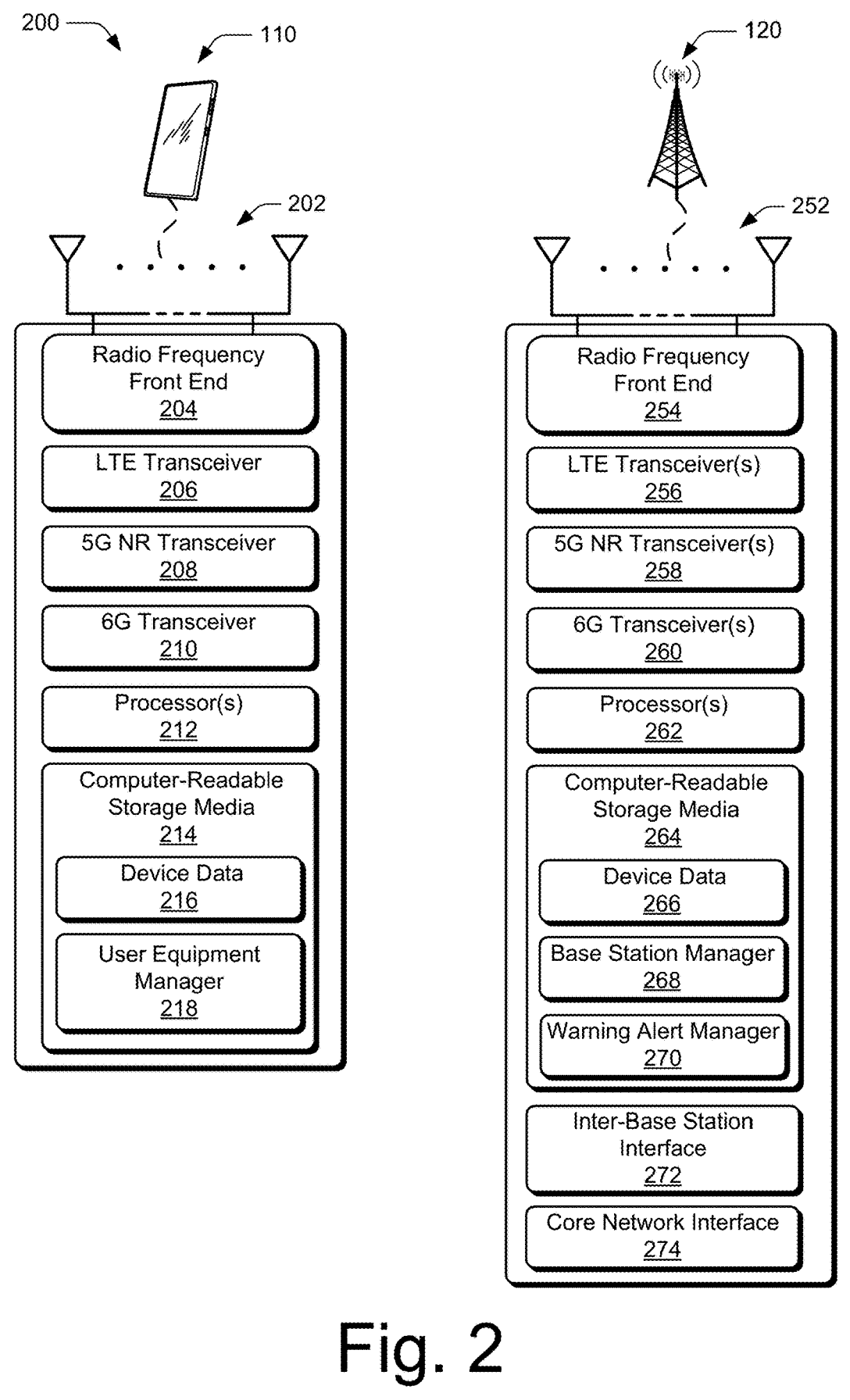

Radio Frequency Front End
204

LTE Transceiver
206

5G NR Transceiver
208

6G Transceiver
210

Processor(s)
212

Computer-Readable Storage Media
214

Device Data
216

User Equipment Manager
218

Radio Frequency Front End
254

LTE Transceiver(s)
256

5G NR Transceiver(s)
258

6G Transceiver(s)
260

Processor(s)
262

Computer-Readable Storage Media
264

Device Data
266

Base Station Manager
268

Warning Alert Manager
270

Inter-Base Station Interface
272

Core Network Interface
274

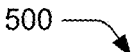
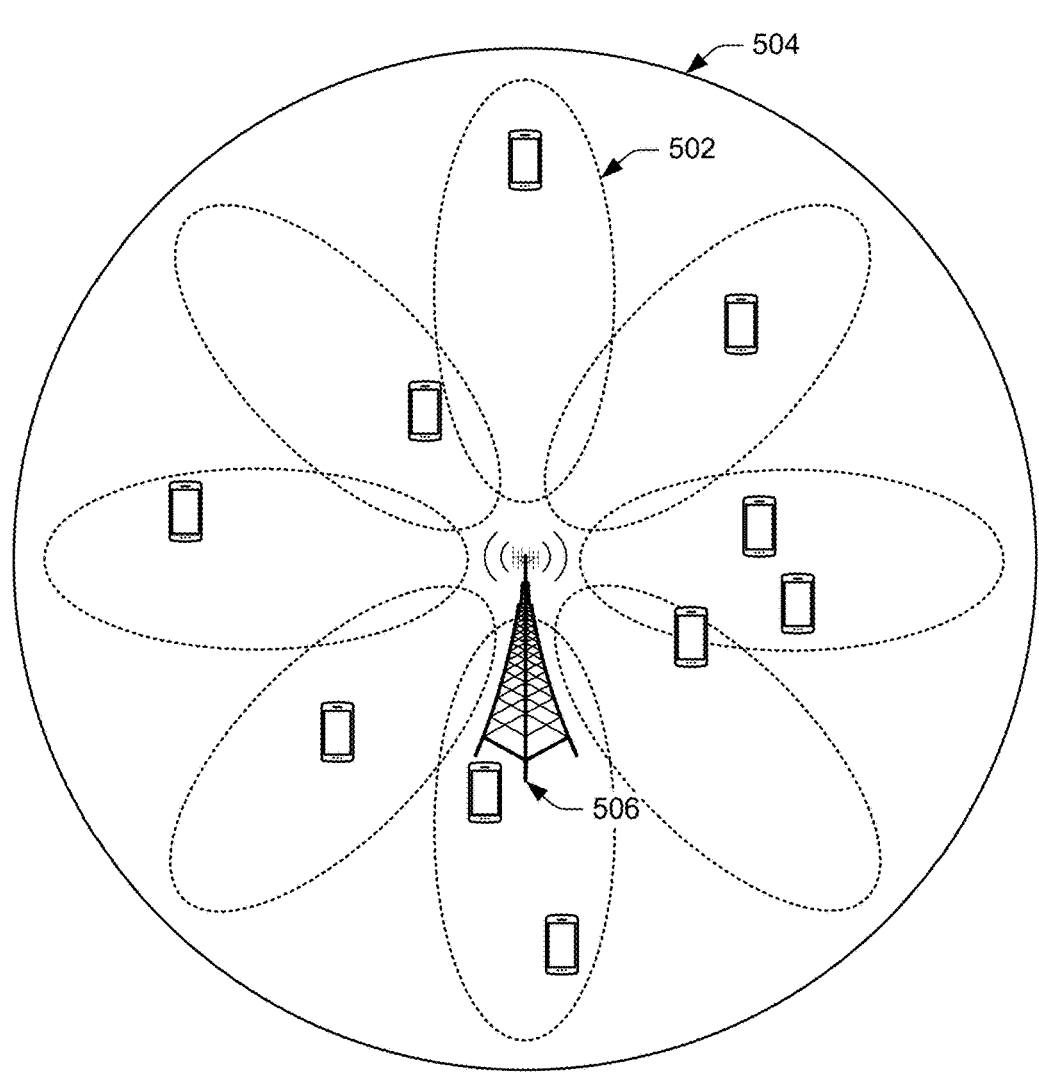
Fig. 5

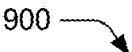
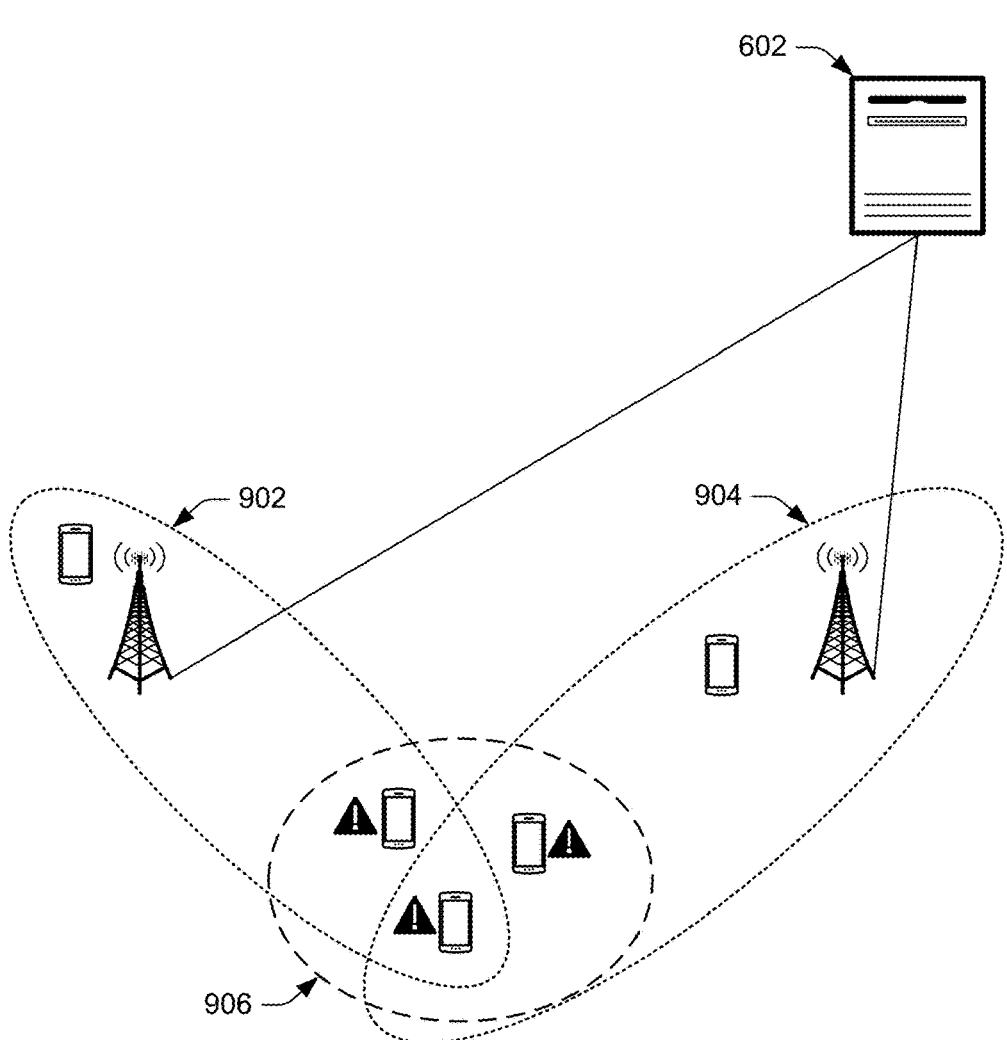
Fig. 9

600 ⟍

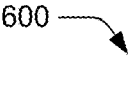

```
┌──────────────────────────────────────────────────┐
│                      1002                          │
│     Store the received UE identifiers and region   │
│      identifiers for multiple user equipment       │
└──────────────────────────────────────────────────┘
                         │
                         ▼
┌──────────────────────────────────────────────────┐
│                      1004                          │
│  For each region identifier, determine a number of │
│   UEs in a spatial region associated with the      │
│        region identifier within a time window      │
└──────────────────────────────────────────────────┘
                         │
                         ▼
┌──────────────────────────────────────────────────┐
│                      1006                          │
│      Compare the determined number of UEs for a    │
│      region identifier to a first threshold value  │
└──────────────────────────────────────────────────┘
                         │
                         ▼
              Number of
   No      UEs >First Threshold
                 Value
                         │
                        Yes
                         ▼
┌──────────────────────────────────────────────────┐
│                      1008                          │
│      Broadcast a first message including a warning │
│      message indicator to UEs in the spatial region│
└──────────────────────────────────────────────────┘
                         │
                         ▼
┌──────────────────────────────────────────────────┐
│                      1010                          │
│  Based on the warning message parameters, broadcast│
│    a second message to the UEs in the spatial region│
│     consistent with the warning message parameters │
└──────────────────────────────────────────────────┘
```

Fig. 10

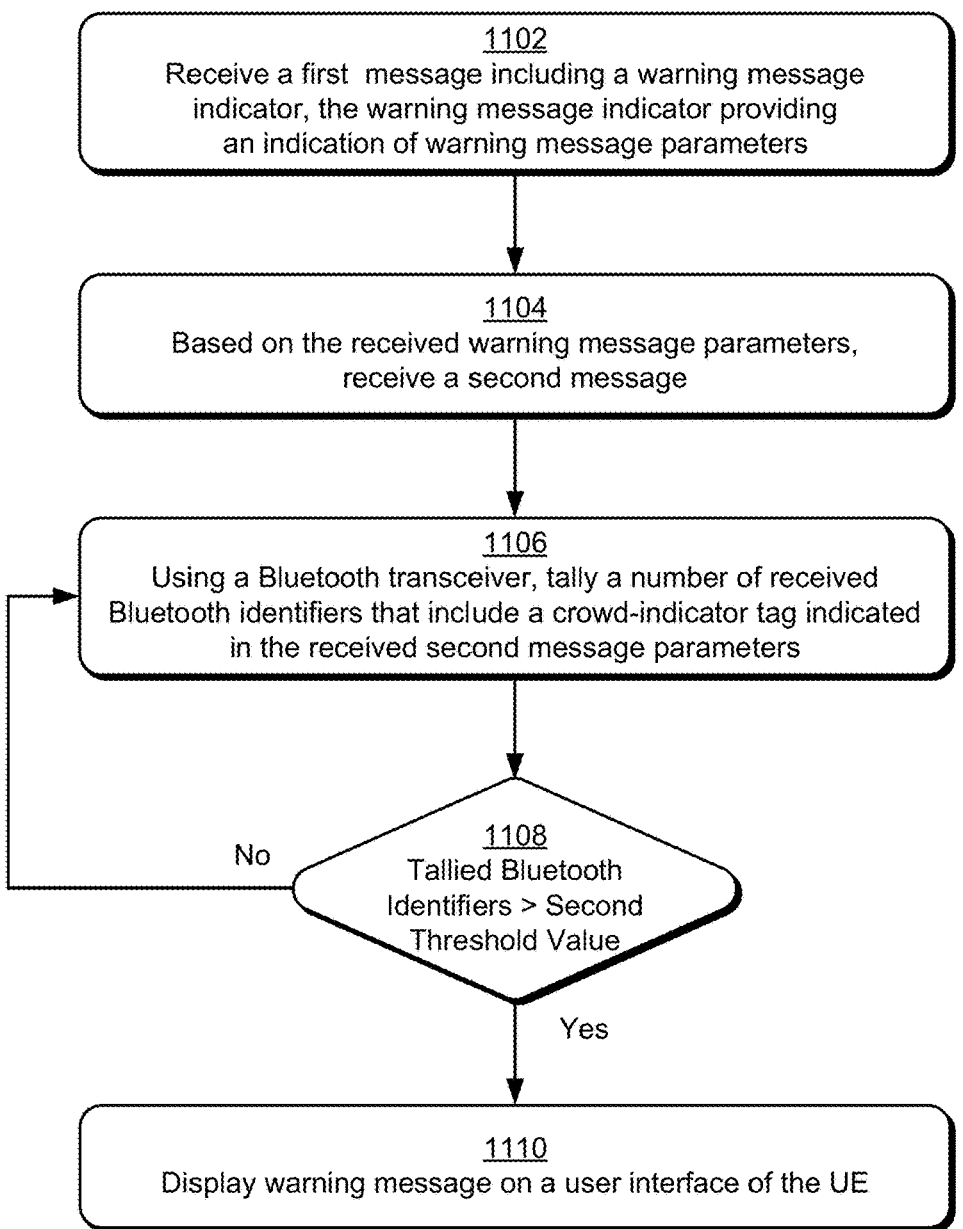

1100

1102
Receive a first message including a warning message indicator, the warning message indicator providing an indication of warning message parameters

1104
Based on the received warning message parameters, receive a second message

1106
Using a Bluetooth transceiver, tally a number of received Bluetooth identifiers that include a crowd-indicator tag indicated in the received second message parameters

1108
Tallied Bluetooth Identifiers > Second Threshold Value

No

Yes

1110
Display warning message on a user interface of the UE

Fig. 11

CELLULAR BROADCAST SYSTEM TO DISPERSE CROWDS

RELATED APPLICATION(S)

This application is a national stage entry of International Application No. PCT/US2022/012115, filed on Jan. 12, 2022, which claims priority to European Application No. 21382090.5, filed on Feb. 4, 2021, the disclosures of which are incorporated herein by reference in their entireties.

BACKGROUND

Cell Broadcast (CB), also known as Short Message Service-Cell Broadcast (SMS-CB) technologies push messages to user equipment (UE) in a cell. Emergency alert systems, such as Wireless Emergency Alerts, Earthquake and Tsunami Warning System (ETWS), EU-Alert, and many others, are based on CB to rapidly distribute alerts to all the UEs in one or more cells.

One factor in mitigating an airborne communicable disease, such as coronavirus disease 2019 (COVID-19), is social distancing to reduce the airborne spread of a pathogen that causes the disease, such as the Severe Acute Respiratory Syndrome Coronavirus 2 (SARS-COV-2) virus. There is an opportunity to enhance CB-based emergency alert systems using other network capabilities to alert users to conditions of overcrowding that may lead to disease spread.

SUMMARY

This summary is provided to introduce concepts of a cellular broadcast system to disperse crowds. The concepts are further described below in the Detailed Description. This summary is not intended to identify essential features of the claimed subject matter, nor is it intended for use in determining the scope of the claimed subject matter.

In aspects, methods, devices, systems, and means for alerting a user equipment (UE) to an overcrowding situation by network entity describe the network entity storing UE identifiers and region identifiers, already known to the network entity, for multiple UEs and for each region identifier, determining a number of UEs in a spatial region associated with at least one region identifier. The network entity compares the determined number of UEs in that spatial region to a first threshold value. If the determined number of UEs in the spatial region exceeds the first threshold value, the network entity broadcasts a first message including a warning message indicator to UEs in the spatial region, the warning message indicator providing an indication of warning message parameters. Based on the warning message parameters, the network entity broadcasts a second message to the UEs in the spatial region.

In other aspects, methods, devices, systems, and means for providing an alert to an overcrowding situation by a user equipment (UE) describe the UE receiving a first message including a warning message indicator, the warning message indicator providing an indication of warning message parameters. Based on the received warning message parameters, the UE receives a second message, and using a Bluetooth or other personal area network transceiver, tallies a number of received Bluetooth identifiers that include a crowd-indicator tag indicated in the received warning message parameters, and compares the number of tallied Bluetooth identifiers to a second threshold value indicated in the received warning message parameters.

BRIEF DESCRIPTION OF THE DRAWINGS

Aspects of a cellular broadcast system to disperse crowds are described with reference to the following drawings. The same numbers are used throughout the drawings to reference like features and components:

FIG. 1 illustrates an example wireless network system in which various aspects of a cellular broadcast system to disperse crowds can be implemented.

FIG. 2 illustrates an example device diagram that can implement various aspects of a cellular broadcast system to disperse crowds.

FIG. 5 illustrates remote radio unit-level crowd estimation in accordance with aspects of a cellular broadcast system to disperse crowds.

FIG. 6 illustrates baseband unit-level crowd estimation in accordance with aspects of a cellular broadcast system to disperse crowds.

FIG. 9 illustrates an example environment for enhanced UE counting in accordance with aspects of a cellular broadcast system to disperse crowds.

FIG. 10 illustrates an example method for a network entity in accordance with aspects of a cellular broadcast system to disperse crowds.

FIG. 11 illustrates an example method for a user equipment in accordance with aspects of a cellular broadcast system to disperse crowds.

DETAILED DESCRIPTION

Figure 3:
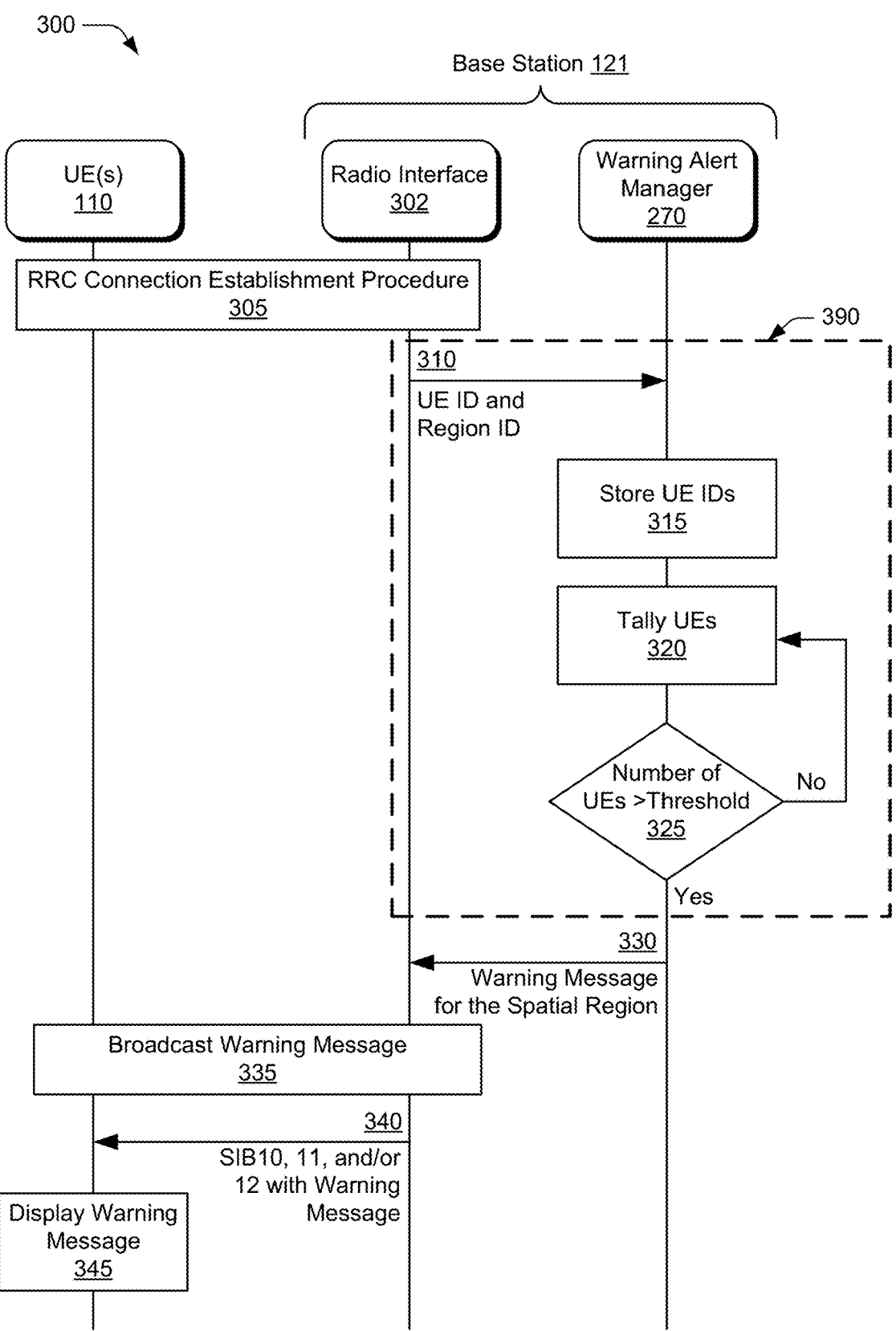
FIG. 3 illustrates example data and control transactions between the UEs and a base station in accordance with aspects of a cellular broadcast system to disperse crowds.

In order to maximize capacity and cell coverage, the fifth generation (5G) of cellular networks has the ability to track the relative position of a user equipment (UE) in relation to the antenna(s) of a base station. Beamforming technology enables high directional antenna gains to compensate for the increase in propagation loss in the higher radio frequency bands used in 5G.

Besides beamforming and Massive MIMO, 5G implements technologies that allow UEs in the same cell to reuse the same time-frequency resources thus increasing the cell capacity (e.g., cell throughput). Multiple cells are connected to remote radio units (RRU) or radio units (RU) responsible for lower physical layer functions of the network protocol stack. A single baseband unit (BBU) controls multiple RRUs or RUs, respectively, in a given geographical area, and the BBU is responsible for the upper physical layer through radio link control layers of the network protocol stack. In 5G networks, the functions of the BBU are distributed between a Central Unit (CU) and one or more Distributed Units (DU).

In aspects, the BBU computes the number of UEs served by the BBU. The number of UEs is aggregated at a beam-level, an RRU-/site-level (all beams belonging to the same RRU or radio site), and/or a BBU-level (CU-level, DU-level). If the BBU determines that the number of UEs at any of these levels exceeds a threshold, the BBU initiates the transmission of a warning message to UEs in an area that exceeded the threshold for UE density.

This warning message can be sent to all UEs in certain areas at System Information Block (SIB) level by using a Cell-Radio Network Temporary Identifier (C-RNTI) and an existing Cell Broadcast (CB) mechanism such as Earthquake and Tsunami Warning System (ETWS), Wireless Emergency Alerts (formerly known as the Commercial Mobile Alert System (CMAS)), EU-alert, or the like.

When the conditions for sending a warning message are met, the BBU sends a message to all UEs in the affected area that directs the UEs to read the next SIB 10, 11, and/or 12 messages that include a warning message to be displayed to the end user of each UE. The information transmitted to the user can include a simple text message informing about the risk of being in a crowded area or more advanced information such as a "heat map" reflecting the distribution of UEs in a spatial region surrounding the UE. The information in the warning message can be rendered by a platform module or application to present the warning to the user in a visual or audible format.

Example Environment

FIG. 1 illustrates an example environment 100 in which various aspects of a cellular broadcast system to disperse crowds can be implemented. The example environment 100 includes a user equipment 110 (UE 110) that communicates with one or more base stations 120 (illustrated as base stations 121 and 122), through one or more wireless communication links 130 (wireless link 130), illustrated as wireless links 131 and 132. Although the user equipment 110 in this example is illustrated as a smartphone, the user equipment 110 may be implemented as any suitable cellular electronic device, such as a mobile communication device, a modem, cellular phone, gaming device, navigation device, media device, laptop computer, desktop computer, tablet computer, smart appliance, or vehicle-based communication system. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, a 6G node B, or the like) may be implemented in a macrocell, microcell, small cell, picocell, distributed base station, and the like, or any combination or future evolution thereof. In this schematic, the environment may reflect either a standalone or non-standalone network architecture depending on base station types and core network type.

The base stations 120 communicate with the user equipment 110 via the wireless links 131 and 132, which may be implemented as any suitable type of wireless link. In this example, the wireless links 131 and 132 are beamformed: however, a base station 120 may alternatively or additionally implement omnidirectional or other spatial geometries. The wireless links 131 and 132 can include a downlink of data and control information communicated from the base stations 120 to the user equipment 110, an uplink of other data and control information communicated from the user equipment 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), 6G, and subsequent evolutions. Multiple wireless links 130 may be aggregated using carrier aggregation to provide a higher data rate for the user equipment 110. Multiple wireless links 130 from multiple base stations 120 may be configured for Coordinated Multipoint (COMP) communication with the user equipment 110. Additionally, multiple wireless links 130 may be configured for single-radio access technology (RAT) (single-RAT) dual connectivity (single-RAT-DC) or multi-RAT dual connectivity (MR-DC).

The base stations 120 collectively form a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) or 6G core network. The base stations 121 and 122 connect, at 102 and 104 respectively, to the core network 150 via an NG2 interface (or analogous 6G interface) for control-plane signaling and via an NG3 interface (or a analogous 6G interface) for user-plane data communications. In addition to connections to core networks, base stations 120 may communicate with each other via an Xn Application Protocol (XnAP), at 112, to exchange user-plane and control-plane data. The user equipment 110 may also connect, via the core network 150, to public networks, such as the Internet 160 to interact with a remote service 170.

The base station 122 is illustrated as a distributed base station implemented using a central node-distributed node architecture. The base station 122 includes a gNB-Central Unit (gNB-CU) 181 and multiple gNB Distributed-Units (gNB-DU) 190, illustrated as gNB-DU 191 and 192. Although two gNB-DUs 190 are illustrated for the sake of clarity in FIG. 1, any suitable number of gNB-DUs can interface to the gNB-CU 181. The base station 122 communicates through an Xn-C interface 182 for control-plane communications with other base stations. In the base station 122, implemented using the central node-distributed node architecture, the Xn-C interface 182 is terminated by the gNB-CU 181. The gNB-CU 181 includes an F1 interface to communicate with the gNB-DUs 190, shown at 183 and 184. Although described as logical nodes, the gNB-CU 181 and/or the gNB-DUs 190 devices may include any suitable components described with respect to the base station 120 in FIG. 2 and may reflect RRU and BBU components or other variants.

Example Devices

FIG. 2 illustrates an example device diagram 200 of the user equipment 110 and the base stations 120. The user equipment 110 and the base stations 120 may include additional functions and interfaces that are omitted from FIG. 2 for the sake of clarity. The user equipment 110 includes antennas 202, a radio frequency front end 204 (RF front end 204), an LTE transceiver 206, a 5G NR transceiver 208, and a 6G transceiver 210 for communicating with base stations 120 in the RAN 140. The RF front end 204 of the user equipment 110 can couple or connect the LTE transceiver 206, the 5G NR transceiver 208, and the 6G transceiver 210 to the antennas 202 to facilitate various types of wireless communication. The antennas 202 of the user equipment 110 may include an array of multiple antennas that are configured similarly to or differently from each other. The antennas 202 and the RF front end 204 can be tuned to, and/or be tunable to, one or more frequency bands defined by the 3GPP LTE, 5G NR, and 6G communication standards and implemented by the LTE transceiver 206, the 5G NR transceiver 208, and/or the 6G transceiver 210. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE, 5G NR, and 6G communication standards.

The user equipment 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the user equipment 110. The device data 216 includes user data, multimedia data, beamforming codebooks, applications, and/or an operating system of the user equipment 110, which are executable by processor(s) 212 to enable user-plane communication, control-plane signaling, and user interaction with the user equipment 110.

In some implementations, the CRM 214 may also include a user equipment manager 218. The user equipment manager 218 can communicate with the antennas 202, the RF front end 204, the LTE transceiver 206, the 5G NR transceiver 208, and/or the 6G transceiver 210 to monitor received communication for warning messages. Based on this receiving a warning message, the user equipment manager 218 can determine to present the warning message using a user interface (not illustrated) of the UE 110.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and/or the 6G transceivers 260 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency band defined by the 3GPP LTE, 5G NR, and 6G communication standards, and implemented by the LTE transceivers 256, one or more 5G NR transceivers 258, and/or one or more 6G transceivers 260. Additionally, the antennas 252, the RF front end 254, the LTE transceivers 256, one or more 5G NR transceivers 258, and/or one or more 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the user equipment 110.

CRM 264 also includes a base station manager 268. Alternately or additionally, the base station manager 268 may be implemented in whole or part as hardware logic or circuitry integrated with or separate from other components of the base stations 120. In at least some aspects, the base station manager 268 configures the LTE transceivers 256, the 5G NR transceivers 258, and the 6G transceiver(s) 260 for communication with the user equipment 110, as well as communication with a core network, such as the core network 150, and routing user-plane and control-plane data for joint communication. Additionally, the CRM 264 also includes a warning alert manager 270 that can determine if an overcrowding situation exists in a spatial region served by the base station 120 and can broadcast a warning message to UEs 110 in the overcrowded spatial region using a technology such as Cell Broadcast (CB).

The base stations 120 include an inter-base station interface 272, such as an Xn and/or X2 interface, which the base station manager 268 configures to exchange user-plane and control-plane data between other base stations 120, to manage the communication of the base stations 120 with the user equipment 110. The base stations 120 include a core network interface 274 that the base station manager 268 configures to exchange user-plane and control-plane data with core network functions and/or entities.

Although the base station 120 is illustrated as a single unit in FIG. 2, the base station can be split or distributed in various fashions to optimize network coverage and/or reduce the cost of providing network coverage. In one example, the base station 120 can include a Central Unit (CU) and one or more Distributed Units (DU). In another example, the functions of the base station 120 can be split between a Baseband Unit (BBU) that is responsible for the upper physical layer through radio link control layers of the network protocol stack and one or more remote radio units (RRU) responsible for the lower physical layer functions of the network protocol stack.

Cellular Broadcast System to Disperse Crowds

To provide warning messages, a crowd-dispersal system first calculates the number of UEs in a given spatial region and then broadcasts a warning message to affected UEs to disperse. The crowd-dispersal system computes the number of UEs at a network-entity level using one of several options. The system can count UEs in a spatial region that is a beam-level spatial region, an RRU-/site-level spatial region, and/or a baseband unit-level spatial region. Counting in a spatial region at the BBU-level (CU-level, DU-level) counts UEs over a large area served by multiple RRUs connected to a BBU. Counting in a spatial region at the RRU-/site-level counts UEs over the area covered by a cell site. Counting in a spatial region at the beam-level counts the number of UEs in one or more beams or one or more portions of a beam(s) by grouping UEs in the beam by the timing advance value of each UE in the beam. The crowd-dispersal system can assign a region identifier (region ID) to a spatial region or combination of spatial regions.

The crowd-dispersal system tracks UEs in each spatial region by the unique C-RNTI a base station assigns to each UE. When a first threshold value for crowd density is exceed for a spatial region, the region ID is used to target an emergency warning to the UEs in the spatial region associated with the particular region ID.

The network only has visibility of UEs in a Radio Resource Control (RRC) connected state. The crowd-dispersal system tallies the number of active UEs for each spatial region during a given time window (e.g., a time window greater than 30 seconds, greater than 1 minute, greater than 5, 10, 15, 30 minutes, and so forth). The crowd-dispersal system selects the length of this time window with an expectation that a large portion of UEs in the spatial region will be in, or transition through, an active state at some point during the time window. By selecting an appropriately-long time window, the system can generate an estimated count that accounts for many of the UEs in a spatial region.

To prevent sending undesired emergency alerts, the crowd-dispersal system differentiates transient crowds in a spatial region from stationary, highly-populated areas of UEs (e.g. UEs in large residential buildings, hospitals, universities, or the like). The crowd-dispersal system compares a current number of active UEs with one or more previously-calculated numbers of active UEs in the same area to determine the transient nature of a potential crowd. To trigger the transmission of a warning message, the crowd-dispersal system can use a first threshold value based on an absolute number of UEs per spatial region (e.g., 10, 25, or 50 UEs) or a relative amount as compared to a historical number of UEs in that area over time (e.g., 110%, 120%, or 150% of the average daily number of UEs).

FIG. 3 illustrates example data and control transactions between the UEs 110 and the base station 121 in accordance with aspects of a cellular broadcast system to disperse crowds. At 305, a UE 110 connects to the base station 121 using a Radio Resource Control (RRC) connection establishment procedure. At 310, a radio interface 302 or associated processor 262 of the base station 121 sends to the warning alert manager 270 an identifier (ID) of the UE (e.g., C-RNTI) and a region ID associated with the spatial region in which the UE is located. Alternatively, the warning alert manager 270 may receive the spatial region of the UE (e.g., beam ID, cell ID) and map that location to a dedicated region identifier that is separate from the UE identifier. The radio interface 302 includes the antennas 252, the RF front end 254, the LTE transceivers 256, one or more 5G NR transceivers 258, and/or one or more 6G transceivers 260.

At 315, the warning alert manager 270 stores the UE ID and region ID optionally along with a time stamp. For example, the warning alert manager 270 stores the UE ID and region ID in a table, a database, or the like. The warning alert manager 270 can periodically update the region IDs for the UEs with stored UE IDs as the location of a UE changes (not illustrated).

At 320, the warning alert manager 270 counts the number of UEs 110 that were in one or more spatial regions, such as at a beam-level, an RRU-/site-level, CU-level, DU-level, and/or a BBU-level over a time window. At 325, the warning alert manager 270 compares the UE counts to one or more thresholds to determine if the UE count in any of the one or more spatial regions exceeds its respective threshold. If no threshold is exceeded, the warning alert manager 270 will return to periodically counting the number of UEs in the one or more spatial regions. Generally, the operations 310, 315, 320, and 325 correspond to a sub-diagram 390 in which the base station 121 determines if the number of active UEs in a spatial region exceeds a first threshold value indicating overcrowding.

If the warning alert manager 270 determines that the UE count for a spatial region has exceeded its first threshold value, the warning alert manager 270 sends 330 a warning message for the spatial region to the radio interface 302. At 335, the radio interface 302 broadcasts a warning message using cell broadcast to the UEs in the spatial region that directs the UEs 110 to receive SIB 10, 11, and/or 12 that includes a warning message.

At 340, the radio interface 302 broadcasts the SIB 10, 11, and/or 12 that includes the warning message. At 345, the UEs 110 receive the SIB 10, 11, and/or 12 and display the included warning message.

Computing Active UEs in a Spatial Region

As mentioned previously, active UEs may be calculated for spatial regions at a beam-level, an RRU-/site-level and/or a BBU-level (CU-level, DU-level). This provides different resolutions for estimating crowd size. Additionally, these different approaches also accommodate the needs of crowd-size estimation in different environments (e.g., rural versus urban environments). A spatial region includes any three-dimensional space in which the radio access network provides coverage. Oftentimes coverage of a RAN is viewed in geographic terms, such as a geographic region of coverage as displayed on a map. A spatial region of coverage can also include an in-building space (e.g., rooms in a convention center, a sports stadium, a subway tunnel, and so forth) A spatial region may also cover a non-horizontal space, such as a beam with an altitude angle. For example, a beam that has an altitude angle to provide coverage to a rooftop deck of a high-rise building but does not provide coverage to lower floors of the building.

Figure 4:
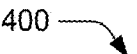
FIG. 4 illustrates beam-level crowd estimation in accordance with aspects of a cellular broadcast system to disperse crowds.

FIG. 4 illustrates beam-level crowd estimation in accordance with aspects of a cellular broadcast system to disperse crowds. In this aspect, the base station 121 (which could be implemented as a distributed base station 122 with a Baseband Unit (BBU) and a Remote Radio Unit (RRU)) calculates the number of active UEs (UEs in the RRC Connected state and/or UEs that transition from an RRC Idle or Inactive state through the RRC Connected state during a time period (e.g., a time period greater than 30 seconds, greater than 1 minute, greater than 5, 10, 15, 30 minutes, and so forth) in which the UEs are counted) per section of a radio beam. Each section of a beam is bounded by the width of the beam and a range of timing advance increments in the beam. For example, the base station 121 transmits a beam 402. Adjacent increments of timing advance values are illustrated at 404, 406, and 408. According to current 3GPP specifications, each increment of one bit in the timing advance value corresponds to an increment of approximately 78 meters from the antenna of the base station. The base station 121 can count active UEs for a single increment of timing advance in a beam, illustrated in the shaded area at 410, or multiple increments of timing advance in a beam. Additionally or optionally, the base station 121 can count active UEs in one or more timing advance increments for one or more beams to form any suitable spatial region that includes the one or more timing advance increments for the one or more beams.

FIG. 5 illustrates remote radio unit-level crowd estimation in accordance with aspects of a cellular broadcast system to disperse crowds. In this aspect, the crowd-dispersal system calculates the number of active UEs per RRU (e.g. gNB-DU 191 or 192). The crowd-dispersal system aggregates the count of active UEs from all the beams 502 in the cell 504 provided by the RRU/base station 506 to determine the number of active UEs in the spatial region covered by the cell 504. As mentioned previously, the crowd-dispersal system may use various combinations (e.g., unions or inter-sections) of beams and timing advance increments to cus-tomize the spatial region.

Figure 6:
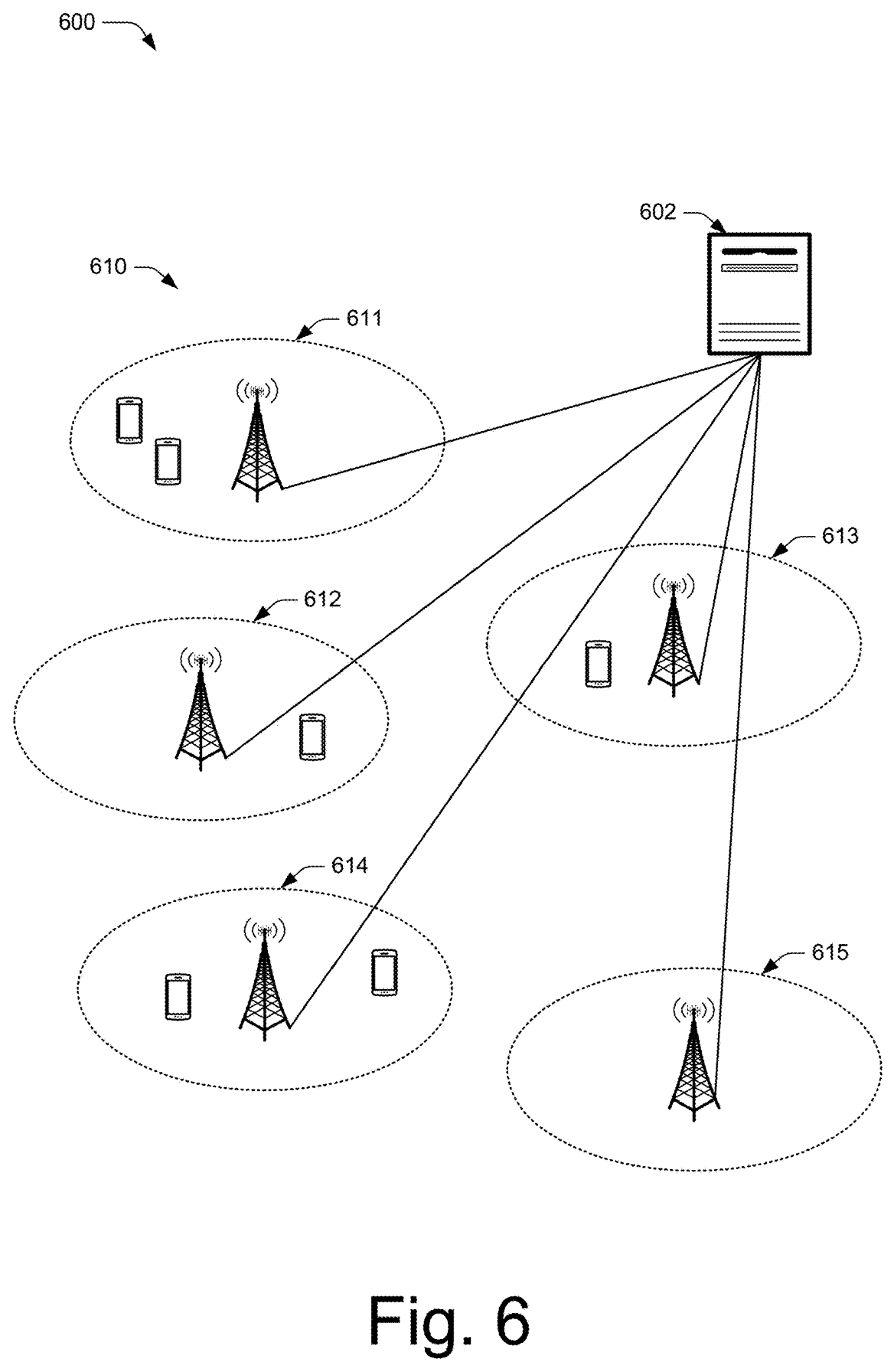

FIG. 6 illustrates baseband unit-level crowd estimation in accordance with aspects of a cellular broadcast system to disperse crowds. In this aspect, a single baseband unit 602 (e.g. gNB-CU 181) is connected to multiple remote radio units 610, illustrated as RRUs 611, 612, 613, 614, and 615, such as a deployment in a dense urban areas with many small cells providing coverage. The crowd-dispersal system aggregates the count of active UEs from one or more of the RRUs 610 controlled by the BBU 602 to determine the number of active UEs in the spatial region covered by the BBU 602 and the multiple RRUs 610.

In FIGS. 4, 5, and 6, a network entity (RRU, and/or BBU) only has visibility of UEs in the RRC Connected state. To increase the likelihood of counting the number of UEs in a spatial region, the network entity will count all UEs that are active within a preconfigured time window (e.g. 15 min-utes). By accumulating the count over the time window, a UE that transitions between and Idle or Inactive state and the connected state will be counted even if the UE is not active for the entire time window.

In an additional and optional aspect, the network entity sends a trigger message (e.g., a broadcast paging message) to UEs that are in the RRC Idle state to direct the idle UEs to initiate a random access procedure. As a result of the random access procedures transitioning the idle UEs to the RRC Connected state, the network entity can count all the responding UEs in a spatial region. Optionally or addition-ally, the network entity can trigger the random access procedure when a high density of UEs is suspected (e.g., based on historical data, near-threshold values of different combinations of spatial regions, or the like). The network entity can transmit the trigger for the random access proce-dure cell-wide (e.g., using a broadcast paging message) or more localized (e.g., a dedicated message to UEs in particu-lar BBU coverage area, RRU coverage area, beam, or section of a beam).

To determine if a warning message should be transmitted, the network entity compares the count of UEs for a time window to a first threshold value. This first threshold value can be an absolute maximum number of counted UEs per spatial region or a maximum density of UEs (e.g., number of active UEs/km$^2$). For a density-based threshold value, the network entity estimates the size of the spatial region. The density-based threshold can be configured into the network entity (e.g., by network planning or management tools) or the network entity can calculate the area of the spatial region based on the beam-width and the timing advance increments in the spatial region, a RRU-level spatial region, or a BBU-level spatial region.

In order to better determine the transient nature of a crowd, the network entity stores the count of UEs in the RRC Connected state over multiple time windows. In each new time window, the network entity compares the current UE count against an average number of active UEs in the same spatial region during the same time window in one or more previous days. The average number of active UEs for each time period will give an indication of the number of UEs that may be considered as residing in the spatial region (e.g., UEs of users living or working in any of the spatial regions). In this case, the preconfigured first threshold value can be in the form an additional number of active UEs above the historical average for that spatial region.

In counting active UEs, there are a number of cellular-capable devices that should be excluded from the count of active UEs. For example, devices that work autonomously like smart meters, security devices, or other Internet of Things (IoT) devices with embedded cellular capabilities. The network entity can make use of the device category (e.g., ue-Category as defined in 3GPP 36.306 chapter 4.1) signaled during the network attach procedure to filter out those devices with category NB1, M1, 0, or 1 from the crowd size calculations. Further, enhanced UE counting, as described below, can further reduce "false positive" indica-tions of overcrowding.

Warning Message Broadcast

When the number of UEs in a spatial region exceeds a first threshold value, the network entity transmits a warning message to UEs in the affected spatial region indicating to UEs the risk of being in that crowded area. A user interface of the UE displays the warning message, and the user acknowledges the warning message to continue using the UE.

The network entity can send the warning message using Cell Broadcast (CB) that delivers short text messages con-taining emergency alerts that are displayed by UEs. Differ-ent countries or regions implement different solutions (Wire-less Emergency Alerts (WEA)/CMAS in US, EWTS in Japan, EU-Alert in Europe, and so forth) based on the CB technology.

Most of the public warning services rely on a central entity residing in the core network 150 for managing the delivery of emergency alerts. In one alternative, to decen-tralize the management of warning message broadcasts, the computation and storage components of the Baseband Unit (BBU) tallies active UEs, determines when thresholds are exceeded, and distributes the warning messages across all affected UEs.

In another alternative, the BBU sends an S1AP message addressed to the Mobility Management Entity (MME) in an LTE network or the Access and Mobility Management Function (AMF) in a 5G NR network. The BBU's S1AP message includes an indication of the affected spatial region to assist the central Cell Broadcast network function to identify which serving area should receive the warning message.

The network entity can broadcast the warning message in one or more radio beams, one or more segments of one or more radio beams, radio cells, and/or groups of cells that are specific to the affected spatial region. To limit the warning broadcast message to only those UEs in certain spatial regions, geofencing technologies, such as those described as part of Wireless Emergency Alerts 3.0 and 3GPP TS 23.041 Rel 15, may be used.

Figure 7:
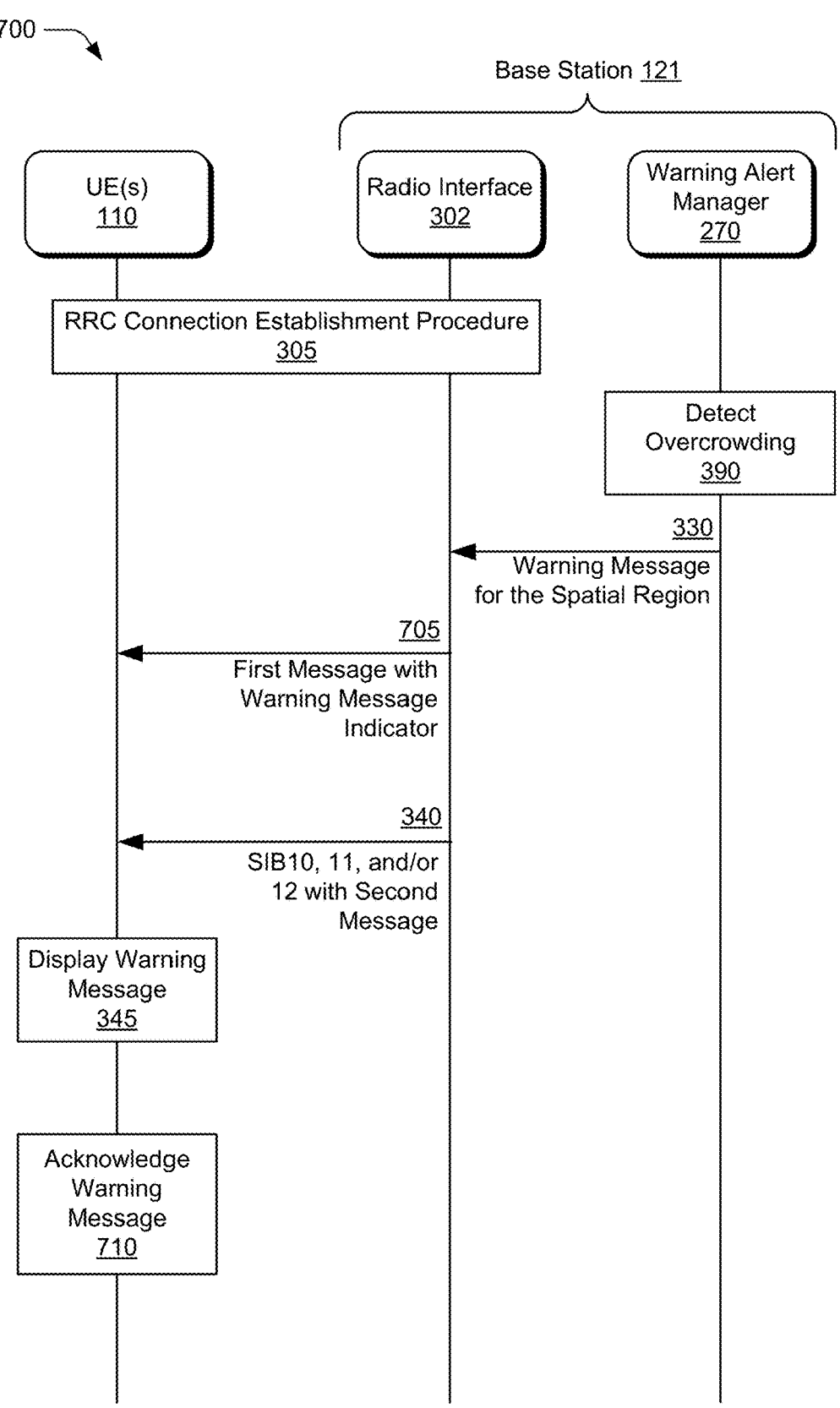
FIG. 7 illustrates example data and control transactions between the UEs and a base station in accordance with aspects of a cellular broadcast system to disperse crowds.

FIG. 7 illustrates example data and control transactions between the UEs 110 and the base station 121 in accordance with aspects of a cellular broadcast system to disperse crowds. FIG. 7 illustrates the use of a broadcast message that includes warning message indicators that direct a UE how to receive a subsequent warning message. At 305, a UE 110 connects to the base station 121 using a Radio Resource Control (RRC) connection establishment procedure. At 390, the base station detects overcrowding in a spatial region, as described with respect to FIG. 3.

Based on the detection of overcrowding, the warning alert manager 270 sends a warning message for the spatial region to the radio interface 302, at 330. At 705, the radio interface 302 transmits a cell-broadcast first message, including a warning message indicator, to the UEs in the spatial region that directs the UEs 110 to receive the SIB 10, 11, and/or 12 that includes the warning message.

At 340, the radio interface 302 transmits the SIB 10, 11, and/or 12 that includes the warning message (second message) to the UEs 110. At 345, the UEs 110 receive the SIB 10, 11, and/or 12 and display the included warning message. At 710, the UE 110 receives an acknowledgement of the warning message from a user via a user interface of the UE 110.

Enhanced UE Counting

In additional and optional aspects, the accuracy and specificity of the warning message can be increased by displaying the warning message only to those users that are under an actual risk of contagion due to the close proximity of other users with UEs. To enable enhanced UE counting, a user of a UE grants permission for the UE to turn on the UE's Bluetooth transceiver, enable visibility mode, and count nearby UEs in response to receiving a broadcast indicator 805 from the network. The Bluetooth-activated UEs can search for other UEs via Bluetooth and, in the case that a UE detects a number of UEs above a second threshold value, the UE displays a warning message on its user interface.

The network provides the second threshold value with the warning message. In order to count UEs that have received the warning message from the network, the Bluetooth-activated UEs will temporarily prepend a distinctive, crowd-indicator tag to their device names. The UE receives the crowd-indicator tag from the network with the warning message. Alternatively, the UEs can use a specific Bluetooth profile for crowd detection that indicates that the UEs have received a warning message and should count surrounding devices. In a further alternative, the UE can receive the second threshold value and the crowd-indicator tag in a message separate from the warning message. This extra step of using Bluetooth-based detection will avoid false positives of UEs that may be in the same crowded cell but are far from other UEs or are separated from other UEs by physical isolation (e.g., walls, different floors in a building, or the like).

Figure 8:
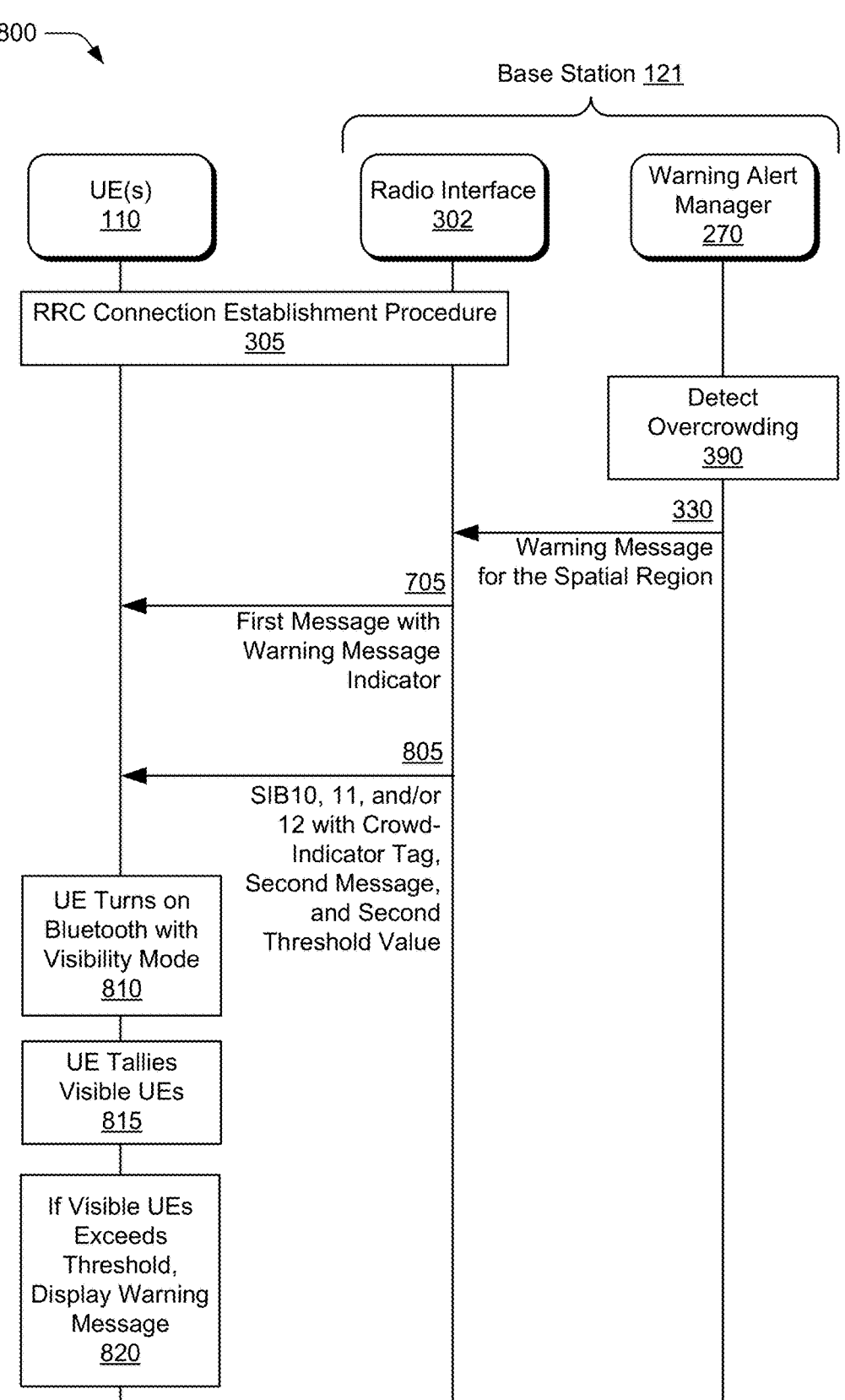
FIG. 8 illustrates example data and control transactions between the UEs and a base station in accordance with aspects of a cellular broadcast system to disperse crowds.

FIG. 8 illustrates example data and control transactions between the UEs 110 and the base station 121 in accordance with aspects of a cellular broadcast system to disperse crowds. At 305, a UE 110 connects to the base station 121 using a Radio Resource Control (RRC) connection establishment procedure. At 390, the base station detects overcrowding in a spatial region, as described with respect to FIG. 3.

Based on the detection of overcrowding, the warning alert manager 270 sends a warning message for the spatial region to the radio interface 302 and related processors, at 330. At 705, the radio interface 302 transmits a cell-broadcast first message with a warning message indicator to the UEs in the spatial region that directs the UEs 110 to receive SIB 10, 11, and/or 12 that includes the warning message.

At 805, the radio interface 302 transmits the SIB 10, 11, and/or 12 to the UEs 110 that includes the warning message (second message), a crowd-indicator tag to display in Bluetooth visibility mode, and the second threshold value. At 810, the UEs 110 receive the SIB 10, 11, and/or 12 and turn on their Bluetooth transceivers, enable visibility mode, and display their identity with the crowd-indicator tag prepended to each UE's identifier.

At 815, the UEs 110 count the number of Bluetooth-visible UEs detected by the UE 110 and, at 820, if the number of counted UEs exceeds the second threshold value, the UE displays a warning message on a user interface.

FIG. 9 illustrates an example environment for enhanced UE counting in accordance with aspects of a cellular broadcast system to disperse crowds. In this example, the Baseband Unit 602 determines that spatial region 902 and spatial region 904 each exceed the first threshold for active UEs. This will trigger the BBU 602 to broadcast messages (330, 705, 805) to all devices in both spatial regions 902 and 904 directing UEs to perform a local count of nearby UEs using Bluetooth discovery. Based on their proximity to each other, only UEs in the spatial region 906 detect, via Bluetooth discovery, that the number of UEs around them exceeds the second threshold value and display the warning message that was received from the network.

Example Methods

Example methods 1000 and 1100 are described with reference to FIGS. 10 and 11 in accordance with one or more aspects of a cellular broadcast system to disperse crowds. FIG. 10 illustrates example method(s) 1000 of a cellular broadcast system to disperse crowds as generally related to a network entity determining to transmit an overcrowding warning message to user equipments as illustrated in the data and control transactions of FIG. 7.

At block 1002, the network entity stores the UE identifiers and region identifiers for multiple UEs. For example, the network entity stores the UE identifiers (e.g., at 315) and region identifiers in a memory (e.g., CRM 264) such as in a table or database in the memory.

At block 1004, for each region identifier, the network entity determines a number of UEs in a spatial region associated with the region identifier within a time window. For example, the network entity tallies (e.g., at 320) the number of UEs in the spatial region that are in the RRC Connected state within a time window.

At block 1006, the network entity compares the determined number of UEs for a region identifier to a first threshold value. For example, the network entity compares (e.g., at 325) the number of tallied UEs to a first threshold value that may be a predetermined threshold provided to the network entity or dynamically calculated based on historical data for the spatial region.

If the determined number of UEs in the spatial region exceeds the first threshold value, at block 1008 the network entity broadcasts a first message including a warning message indicator to UEs in the spatial region. The warning message indicator provides an indication of warning message parameters such as SIB acquisition information and optionally enhanced UE counting instructions as previously describe with reference to FIG. 7. At block 1010, the network entity broadcasts a second (warning) message to the UEs in the spatial region consistent with the warning message parameters. For example, if the number of counted UEs exceeds the first threshold value, the network entity transmits a paging or a cell broadcast message (e.g. at 705) including a warning message indicator to UEs in the spatial region and transmits a warning message (e.g., at 340) in one or more of System Information Blocks (SIBs) 10, 11, and 12.

If the determined number of UEs in the spatial region does not exceed the first threshold value, the network entity returns to block 1004 and starts tallying the number of UEs in a spatial region for a next time period. For example, if the determined number of UEs in the spatial region does not exceed the first threshold value during a first time period, the network starts determining a new tally of UEs for a second time period. The time windows may overlap in time (e.g., 15 minute time windows starting every 5 minutes), sequentially follow one another (e.g., one 5 minute time window followed by another 5 minute time window), or have gaps in-between (e.g., a 10 minute time window at the beginning of every hour). The time windows may vary depending on time-of-day (e.g., evenings), day-of-week (e.g., weekends), or day-of-year (e.g., holidays).

FIG. 1100 illustrates example method(s) 1100 of a cellular broadcast system to disperse crowds as generally related to the user equipment 110 determining to display a warning message as illustrated in the data and control transactions of FIG. 8. At block 1102, a user equipment receives a first message including a warning message indicator, the warning message indicator providing an indication of warning message parameters. For example, a user equipment (e.g., UE 110) receives the first paging or cell broadcast message (e.g., at 705) that includes a warning message indicator from a network entity (e.g., the base station 121) as described with reference to FIG. 7

At block 1104, based on the received warning message parameters, the UE receives a second (warning) message. For example, the user equipment uses the parameters received in the first message to receive (e.g., at 805) a warning notification in one or more of System Information Blocks (SIBs) 10, 11, and 12 that includes a crowd-indicator tag and a second threshold value from a network entity (e.g., the base station 121) as described with reference to FIG. 8.

At block 1106, using a Bluetooth transceiver, the UE tallies a number of received Bluetooth identifiers that include a crowd-indicator tag indicated in the received warning message parameters. For example, the user equipment prepends the crowd-indicator tag to a Bluetooth identifier of the UE, transmits the prepended crowd-indicator tag using a Bluetooth transceiver, and receives one or more Bluetooth identifiers from other UEs.

At block 1108, the user equipment compares the number of tallied Bluetooth identifier to a second threshold value indicated in the received warning message parameters. For example, the user equipment tallies the number of received Bluetooth identifiers that include the crowd-indicator tag and compares the tally to the second threshold value. If the tallied number exceeds the second threshold value, at block 1110, the UE displays the warning message on a user interface of the UE (e.g., at 345). Otherwise, if the tallied number is below the second threshold value, then the UE does not display the warning message and may return to block 1106 to tally the number of received Bluetooth identifiers that include the crowd-indicator tag for another time period.

The order in which the method blocks of methods 1000 and 1100 are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following text some examples are described:

Example 1: A method of alerting a user equipment (UE) to an overcrowding situation by a network entity, the method comprising the network entity:

storing UE identifiers and region identifiers for multiple UEs;

for each region identifier, determining a number of UEs in a spatial region associated with the region identifier;

comparing the determined number of UEs for a region identifier to a first threshold value;

if the determined number of UEs in the spatial region exceeds the first threshold value:

broadcasting a first message including a warning message indicator to UEs in the spatial region, the warning message indicator providing an indication of warning message parameters; and based on the warning message parameters, broadcasting a second message to the UEs in the spatial region, the second message including a crowd-indicator tag and a second threshold value.

Example 2: The method of example 1, wherein the determining the number of UEs in the spatial region comprises:

tallying the number of UEs in a Radio Resource Control, RRC, Connected state.

Example 3: The method of example 2, wherein the tallying the number of UEs in the RRC Connected state comprises:

counting the number of UEs in the RRC Connected state at any time during a time period.

Example 4: The method of example 2 or example 3, further comprising the network entity:

transmitting a trigger message to the spatial region that directs UEs in an RRC Idle state or an RRC Inactive state in that spatial region to perform a random access procedure to direct the UEs in the RRC Idle state or the RRC Inactive state to transition to the RRC Connected state.

Example 5: The method of any one of the preceding examples, wherein the crowd-indicator tag and the second threshold value are effective to direct a UE receiving the warning message to activate a Bluetooth transceiver and a visibility mode to count other UEs transmitting the crowd-indicator tag and compare the number of counted UEs to the second threshold value.

Example 6: The method of example 5, wherein the second threshold value is an absolute threshold number.

Example 7: The method of any one of the preceding examples, wherein the spatial region is one of:

a beam-level spatial region;

a Remote Radio Unit-level, RRU-level, spatial region;

a Central Unit-level, CU-level;

a Distributed Unit-level, DU-level; or a baseband unit-level, BBU-level, spatial region.

Example 8: The method of example 7, wherein the spatial region is a beam-level spatial region, and wherein a timing advance value is associated with each section of a beam, the method further comprising the network entity:

for a given timing advance value in the beam, determining a number of UEs associated with a respective timing advance value.

Example 9: The method of example 8, wherein the comparing the determined number of UEs in the spatial region to the first threshold value comprises:

comparing the determined number of UEs for a single timing advance value to the first threshold value.

Example 10: The method of example 8, wherein the comparing the determined number of UEs in the geographic area to the first threshold value comprises:

comparing the determined number of UEs for multiple timing advance values to the first threshold value.

Example 11: The method of any one of the preceding examples, wherein the broadcasting the second message to the UEs comprises:

broadcasting the second message in one or more of System Information Blocks, SIBs, 10, 11, and 12.

Example 12: The method of any one of the preceding examples, wherein the first threshold value is an absolute threshold number or a relative amount.

Example 13: A method of providing an alert to an overcrowding situation by a user equipment, UE, the method comprising the user equipment:

receiving a first message including a warning message indicator, the warning message indicator providing an indication of warning message parameters;

receiving a second message based on the received warning message parameters;

using a Bluetooth transceiver, tallying a number of received Bluetooth identifiers that include a crowd-indicator tag; and comparing the number of tallied Bluetooth identifiers to a second threshold value.

Example 14: The method of example 13, wherein the crowd-indicator tag and the second threshold value are indicated in the received warning message parameters or wherein the crowd-indicator tag and the second threshold value are indicated in a separate message.

Example 15: The method of example 13, wherein the tallying a number of received Bluetooth identifiers that include a crowd-indicator tag comprises:

activating a Bluetooth transceiver and a visibility mode;

prepending the crowd-indicator tag to a Bluetooth identifier of the UE;

transmitting the prepended crowd-indicator tag and Bluetooth identifier using the Bluetooth transceiver; and receiving one or more Bluetooth identifiers from other UEs.

Example 16: The method of any one of examples 13 to 15, wherein the UE is in a Radio Resource Control, RRC, Idle state or an RRC Inactive state, the method further comprises the user equipment:

receiving a trigger message that directs the UE to perform a random access procedure; and initiating the random access procedure to transition the UE from the RRC Idle state or the RRC Inactive state to an RRC Connected state.

Example 17: The method of any one of examples 13 to 16, wherein the receiving the warning message comprises:

receiving the warning message in one or more of System Information Blocks, SIBs, 10, 11, and 12.

Example 18: A network entity comprising:

a processor; and instructions for a warning alert manager application that are executable by the processor to configure the network entity to perform any of the methods of examples 1 to 12.

Example 19: The method of example 18, wherein the network entity is one of:

a base station;

a Distributed Unit, DU;

a Central Unit, CU;

a baseband unit, BBU;

a radio unit, RU; or

16 a remote radio unit, RRU.

Example 20: A user equipment comprising:

a wireless transceiver;

a processor; and instructions for a user equipment manager that are executable by the processor to configure the user equipment to perform any of the methods of examples 13 to 17.

Example 21: A computer-readable medium comprising instructions that, when executed by a processor, cause an apparatus comprising the processor to perform any of the methods of examples 1 to 17.

Throughout this disclosure, examples are described where a computing system (e.g., the UE, a client device, a server device, a computer, a network entity, a base station, or another type of computing system) may analyze information (e.g., a UE identifier, a region identifier) associated with the user equipment of a user. Further to the descriptions above, a user may be provided with controls allowing the user to make an election as to both if and when systems, programs, and/or features described herein may enable collection of information (e.g., information about a user's current location, the transmission of a UE device identifier), and if the user is sent content or communications from a server. The computing system can be configured to only use the information after the computing system receives explicit permission from the user of the computing system to use the data. For example, the user provides explicit permission to enable a Bluetooth transceiver and visibility mode. Further, individual users may have constant control over what programs can or cannot do with the information. In addition, information collected may be pre-treated in one or more ways before it is transferred, stored, or otherwise used, so that personally-identifiable information is removed. Thus, the user may have control over whether information is collected about the user and the user's device, and how such information, if collected, may be used by the computing device and/or a remote computing system.

Although aspects of a cellular broadcast system to disperse crowds have been described in language specific to features and/or methods, the subject of the appended claims is not necessarily limited to the specific features or methods described. Rather, the specific features and methods are disclosed as example implementations of a cellular broadcast system to disperse crowds, and other equivalent features and methods are intended to be within the scope of the appended claims. Further, various different aspects are described, and it is to be appreciated that each described aspect can be implemented independently or in connection with one or more other described aspects.

What is claimed is:

1. A method of alerting a user equipment (UE) to an overcrowding situation by a network entity, the method comprising the network entity:

storing UE identifiers and region identifiers for multiple UEs;

for each region identifier, determining a number of UEs in a spatial region associated with the region identifier;

comparing the determined number of UEs for a region identifier to a first threshold value;

if the determined number of UEs in the spatial region exceeds the first threshold value:

broadcasting a first message including a warning message indicator to UEs in the spatial region, the warning message indicator providing an indication of warning message parameters; and based on the warning message parameters, broadcasting a second message to the UEs in the spatial region, the second message including a crowd-indicator tag and a second threshold value, the crowd-indicator tag and the second threshold value being effective to direct a UE receiving the second message to i) activate a Bluetooth transceiver and a visibility mode to receive one or more Bluetooth identifiers from other UEs, ii) count a number of received Bluetooth identifiers that include the crowd-indicator tag, and iii) compare the number of counted Bluetooth identifiers to the second threshold value.

2. The method of claim 1, wherein the determining the number of UEs in the spatial region comprises:
tallying the number of UEs in a Radio Resource Control (RRC) Connected state.

3. The method of claim 2, wherein the tallying the number of UEs in the RRC Connected state comprises:
counting the number of UEs in the RRC Connected state at any time during a time period.

4. The method of claim 2, further comprising the network entity:
transmitting a trigger message to the spatial region that directs UEs in an RRC Idle state or an RRC Inactive state in that spatial region to perform a random access procedure to direct the UEs in the RRC Idle state or the RRC Inactive state to transition to the RRC Connected state.

5. The method of claim 1, wherein the second threshold value is an absolute number.

6. The method of claim 1, wherein the spatial region is one of:
a beam-level spatial region;
a Remote Radio Unit-level (RRU-level) spatial region;
a Central Unit-level (CU-level);
a Distributed Unit-level (DU-level); or
a baseband unit-level (BBU-level) spatial region.

7. The method of claim 6, wherein the spatial region is a beam-level spatial region, and wherein a timing advance value is associated with each section of a beam, the method further comprising the network entity:
for a given timing advance value in the beam, determining a number of UEs associated with a respective timing advance value.

8. The method of claim 1, wherein the broadcasting the second message to the UEs comprises:
broadcasting the second message in one or more of System Information Blocks (SIBs) 10, 11, and 12.

9. The method of claim 1, wherein the first threshold value is an absolute threshold number or a relative amount.

10. A method of providing an alert to an overcrowding situation by a user equipment (UE) the method comprising the user equipment:
receiving a first message including a warning message indicator, the warning message indicator providing an indication of warning message parameters;
receiving a second message based on the warning message parameters, the second message including a crowd-indicator tag and a second threshold value;
activating a Bluetooth transceiver and a visibility mode;
receiving one or more Bluetooth identifiers from other UEs;
using the Bluetooth transceiver, counting a number of received Bluetooth identifiers that include the crowd-indicator tag; and
comparing the number of counted Bluetooth identifiers to the second threshold value.

11. The method of claim 10, wherein the crowd-indicator tag and the second threshold value are indicated in the received warning message parameters or wherein the crowd-indicator tag and the second threshold value are indicated in a separate message.

12. The method of claim 10, further comprising
prepending the crowd-indicator tag to a Bluetooth identifier of the UE; and
transmitting the prepended crowd-indicator tag and Bluetooth identifier using the Bluetooth transceiver.

13. The method of claim 10, wherein the UE is in a Radio Resource Control (RRC) Idle state or an RRC Inactive state, the method further comprises the user equipment:
receiving a trigger message that directs the UE to perform a random access procedure; and
initiating the random access procedure to transition the UE from the RRC Idle state or the RRC Inactive state to an RRC Connected state.

14. The method of claim 10, wherein the receiving the second message comprises:
receiving the second message in one or more of System Information Blocks (SIBs) 10, 11, and 12.

15. A network entity comprising:
a processor; and
instructions for a warning alert manager application that are executable by the processor to configure the network entity to:
store user equipment (UE) identifiers and region identifiers for multiple UEs;
for each region identifier, determine a number of UEs in a spatial region associated with the region identifier;
compare the determined number of UEs for a region identifier to a first threshold value;
if the determined number of UEs in the spatial region exceeds the first threshold value:
broadcast a first message including a warning message indicator to UEs in the spatial region, the warning message indicator providing an indication of warning message parameters; and
based on the warning message parameters, broadcast a second message to the UEs in the spatial region, the second message including a crowd-indicator tag and a second threshold value, the crowd-indicator tag and the second threshold value being effective to direct a UE receiving the second message to i) activate a Bluetooth transceiver and a visibility mode to receive one or more Bluetooth identifiers from other UEs, ii) count a number of received Bluetooth identifiers that include the crowd-indicator tag, and iii) compare the number of counted Bluetooth identifiers to the second threshold value.

16. The network entity of claim 15, wherein the network entity is one of:
a base station;
a Distributed Unit (DU);
a Central Unit (CU);
a baseband unit (BBU);
a radio unit (RU); or
a remote radio unit (RRU).

17. The network entity of claim 15, wherein the instructions to determine the number of UEs in the spatial region are executable by the processor to configure the network entity to:
tally the number of UEs in a Radio Resource Control (RRC) Connected state.

18. The network entity of claim 17, wherein the instructions to tally the number of UEs in the RRC Connected state are executable by the processor to configure the network entity to:

count the number of UEs in the RRC Connected state at any time during a time period.

19. A user equipment comprising:

a wireless transceiver;

a processor; and instructions for a user equipment manager that are executable by the processor to configure the user equipment to:

receive a first message including a warning message indicator, the warning message indicator providing an indication of warning message parameters;

receive a second message based on the warning message parameters, the second message including a crowd-indicator tag and a second threshold value;

activate a Bluetooth transceiver and a visibility mode;

receive one or more Bluetooth identifiers from other UEs;

using the Bluetooth transceiver, count a number of received Bluetooth identifiers that include the crowd-indicator tag; and compare the number of counted Bluetooth identifiers to the second threshold value.

20. The user equipment of claim 19, wherein the crowd-indicator tag and the second threshold value are indicated in the received warning message parameters or wherein the crowd-indicator tag and the second threshold value are indicated in a separate message.

* * * * *